US008082434B2

(12) United States Patent
Hocking et al.

(10) Patent No.: US 8,082,434 B2
(45) Date of Patent: Dec. 20, 2011

(54) SYSTEM AND METHOD FOR PROVIDING A SECURE COMPUTING ENVIRONMENT

(75) Inventors: Marc Hocking, London (GB); Nigel Lee, Reading (GB); Andrew Palka, Reading (GB)

(73) Assignee: Becrypt Limited, Berkshire (GB)

( * ) Notice: Subject to any disclaimer, the term of this patent is extended or adjusted under 35 U.S.C. 154(b) by 930 days.

(21) Appl. No.: 12/062,219

(22) Filed: Apr. 3, 2008

(65) Prior Publication Data
US 2009/0070576 A1   Mar. 12, 2009

(30) Foreign Application Priority Data

Apr. 5, 2007 (GB) .................................... 0706810.9

(51) Int. Cl.
*G06F 15/177* (2006.01)
(52) U.S. Cl. ................... 713/2; 713/1; 713/100
(58) Field of Classification Search ............... 713/1, 100
See application file for complete search history.

(56) References Cited

U.S. PATENT DOCUMENTS

| | | | | |
|---|---|---|---|---|
| 7,308,570 | B2* | 12/2007 | Young et al. ...................... | 713/2 |
| 7,743,422 | B2* | 6/2010 | Narayanaswami et al. ..... | 726/25 |
| 7,780,080 | B2* | 8/2010 | Owen et al. .................... | 235/382 |
| 2003/0145191 | A1* | 7/2003 | Park ................................. | 713/1 |
| 2005/0138414 | A1 | 6/2005 | Zimmer et al. | |
| 2007/0180509 | A1* | 8/2007 | Swartz et al. .................... | 726/9 |
| 2008/0215873 | A1* | 9/2008 | Bobrow ............................ | 713/2 |

FOREIGN PATENT DOCUMENTS

WO          93/17388          9/1993

OTHER PUBLICATIONS

Clark, et al., "Bits: A Smartcard Protected Operating System" Communications of the Association for Computing Machinery, ACM, New York, NY, US, vol. 37, No. 11, Nov. 1, 1994, pp. 66-70, 94.

* cited by examiner

*Primary Examiner* — Nitin Patel
(74) *Attorney, Agent, or Firm* — Leason Ellis LLP

(57) ABSTRACT

A system and method for providing a secure computing environment to untrusted computer systems is described. A carrier media and an interface are provided, the interface being connectable to a computer to enable communication between the computer and the carrier media. The carrier media encodes a secure computing environment and a boot system, upon connection of the system via the interface to a computer system and booting of the computer system, the boot system is operative to take over the boot process of the computer system and to authenticate the user, wherein upon successful authentication, the boot system is arranged to load the secure computing environment on the computer system, the secure computing environment being configured to prevent predetermined interaction from outside the secure computing environment when it is running.

20 Claims, 6 Drawing Sheets

SYSTEM AND METHOD FOR PROVIDING A SECURE COMPUTING ENVIRONMENT

This application claims the benefit of Great Britain Application No. 0706810.9, filed on Apr. 5, 2007, the entire disclosure of which is incorporated by reference herein.

FIELD OF THE INVENTION

The present invention relates to a system for providing a secure computing environment that is particularly applicable to remote users.

BACKGROUND TO THE INVENTION

Computer systems are now central to most businesses. Whilst businesses typically are able to support and manage computers and networks located within their own premises, it is significantly more difficult to provide support and management of computers used by a user working at home, away from the office or the like. Whilst in some instances it is possible for the user to bring the computer system to the business premises to have it appropriately configured, most businesses do not consider a home computer their responsibility, nor is convenient for this to be done every time a configuration change or software change needs to take place.

A further issue concerns disaster recovery. Given the emphasis on a business' computer system, it is somewhat surprising that most disaster recovery scenarios give the computer system limited priority in terms of business continuity. If the business premises were to burn down, be flooded or similar, it is typically the computer system that takes the longest to be brought back online. Even with appropriate backups, restoring a full computer system can take many man days. Some businesses simply assume that users will be able to go on without computer systems, although this logic today is flawed.

The less control an organisation has over computers used in its business, the greater the threat that the business faces. There are often good reasons why users may wish to make use of computers or devices over which an organisation has little or no control. For example, a user having the occasional requirement to work from home may try to use his or her home PC, as the frequency of which the user wishes to work from home does not make the purchase and maintenance of a laptop dedicated for this purpose cost effective.

Similarly, business continuity may mean that access to the business' IT resources is permitted from an untrusted machine in the event of an emergency. Whilst security may be high on the agenda during normal business operations, when a business is in disaster recovery, much of the emphasis on security is sidelined in an attempt to keep the business running. This may mean that machines that are not appropriately under the control of the business are used simply because they are the only ones that are available. Similarly, a user may require access to corporate resources from an untrusted machine in the event of a laptop loss or failure or where they are in an environment such as an internet café where only the shared machines provided can access the internet.

Various different approaches to these problems have been proposed. Some systems are now beginning to offer management of virtualised systems. A virtual environment is installed on an end user machine and then a virtual system image is provided that can be run in the virtual environment. The virtual system is typically defined and controlled by the business and cannot be changed by the user. This enables a business to manage and secure an environment, home desktops and the like without the need to control the whole machine. However, this is an extremely invasive measure that requires software to be installed on the machine to provide support for the virtual environment. Additionally, the virtual environment typically runs while the existing operating system is active. Furthermore, the system is not wholly under the control of the business as the virtual environment software is still exposed to the user and also requires a functional operating system on the machine. Whilst the business is given a measure of security via the virtualisation technology, the software is directly installed on the home user's PC and there are limits to the extent to which that PC and its resources can be locked down and to which tampering and replication of the virtualised environment can be prevented.

In respect of remote workers, whilst there exist systems that attempt to provide a secure environment through which corporate resources can be accessed from a non-trusted machine, these are still weak and often leave a footprint that can be cracked or data otherwise recovered once the user leaves the untrusted machine.

Various systems have been suggested to remove a footprint once the user leaves the untrusted machine. However these typically involve wiping virtual memory and are flawed because:

The virtual/physical mechanism may have been hijacked by a rootkit or similar exploit (for example, a hook may be inserted into the page fault handler)

The virtual memory (VM) module may arbitrarily remove the physical page at anytime.

The software may clear itself if the current page is stolen while running.

The os data structures will be destroyed by the cleaning process and the software actually wiping the virtual memory would be affected and may not run properly.

STATEMENT OF THE INVENTION

According to an aspect of the present invention, there is provided a system comprising a carrier media and an interface, the carrier media encoding a secure computing environment and a boot system, wherein upon connection of the system via the interface to a computer system and booting of the computer system, the boot system being operative to take over the boot process of the computer system and to authenticate the user, wherein upon successful authentication, the boot system is arranged to load the secure computing environment on the computer system, the secure computing environment being configured to prevent predetermined interaction from outside the secure computing environment when it is running.

The present invention seeks to provide a system in which a secure computing environment can be provided to remote workers and also made available for use in disaster recovery scenarios which may, for example, require access to corporate networks from un-managed computers. The presently claimed invention addresses challenges that cannot be adequately addressed through end-point health checks alone. An encrypted carrier media stores a secure computer environment which, when accessed from an un-managed computing device, enables access to the secure computing environment in a manner such that it is isolated from its temporary host.

Preferably, the carrier media also provides data storage enabling data for use by the user in the secure computing environment or generated by the user when using the secure computing environment to be securely stored and be transportable.

Preferably, the carrier media is a bootable solid-state memory that includes its own interface to the host. For example, it may be a USB key. Optionally, the memory may cooperate with an alternate boot device, such as a bootable CD or DVD, to enable legacy host systems that do not support boot directly from the carrier media to be used, or where the boot order of devices does not provide USB boot sufficient priority.

This form of cooperation between media would entail the initial boot media, for example CD, being responsible for loading a USB device driver and interrupt handlers required for chaining through to an encrypted operating system on the second form of media.

In a preferred embodiment, the secure environment may, in operation, take control of the host such that upon shut down of the host or removal of the carrier media from the host, the secure environment is operative to erase data stored in volatile memory in the host.

The secure environment preferably provides controllable access to resources of the host. For example, access to host resources could be blocked. Alternatively, access to host input devices such as human interface devices may be enabled.

The secure environment is preferably encrypted on the carrier media. A boot system on the carrier media is arranged to take over the boot process when the carrier media is connected to a host and the host is booted. The boot system preferably triggers a pre-boot security check in which the integrity of the carrier media and secure environment is tested and also during which time user authentication is performed.

Successful authentication causes the boot system to decrypt and load the secure environment in the host.

In this manner, embodiments of the present invention enable a business to dictate exactly the form and content of a remote secure environment that is deployed. Privileges and functionality can be restricted to a particular user (for example the secure environment may offer different functionalities to different users depending on a predetermined level of trust). Additionally, the secure environment is able to provide complete isolation from its host machine's operating system. Security of the secure environment is not dependent upon trust in software external to the secure environment, such as the host machine's operating system, or upon trust of the user, as is the case in virtualised systems.

In this manner, a secure environment can be provided to users that occasionally work remotely without the need for providing laptops and the like. Similarly, members of staff can be provided with appropriate USB keys that be used to provide business continuity in the event of an emergency. Where users require to work at different levels of security classification, different hardware systems do not need to be provided to the user, merely different versions of a secure environment according to an embodiment of the present invention. Not only should embodiments of the present invention reduce management overheads and improve efficiency for remote users, they should also enable licensing costs to be significantly reduced.

BRIEF DESCRIPTION OF THE DRAWINGS

Embodiments of the present will now be described in detail, by way of example only, with reference to the accompanying drawings in which.

DETAILED DESCRIPTION

Figure 1:
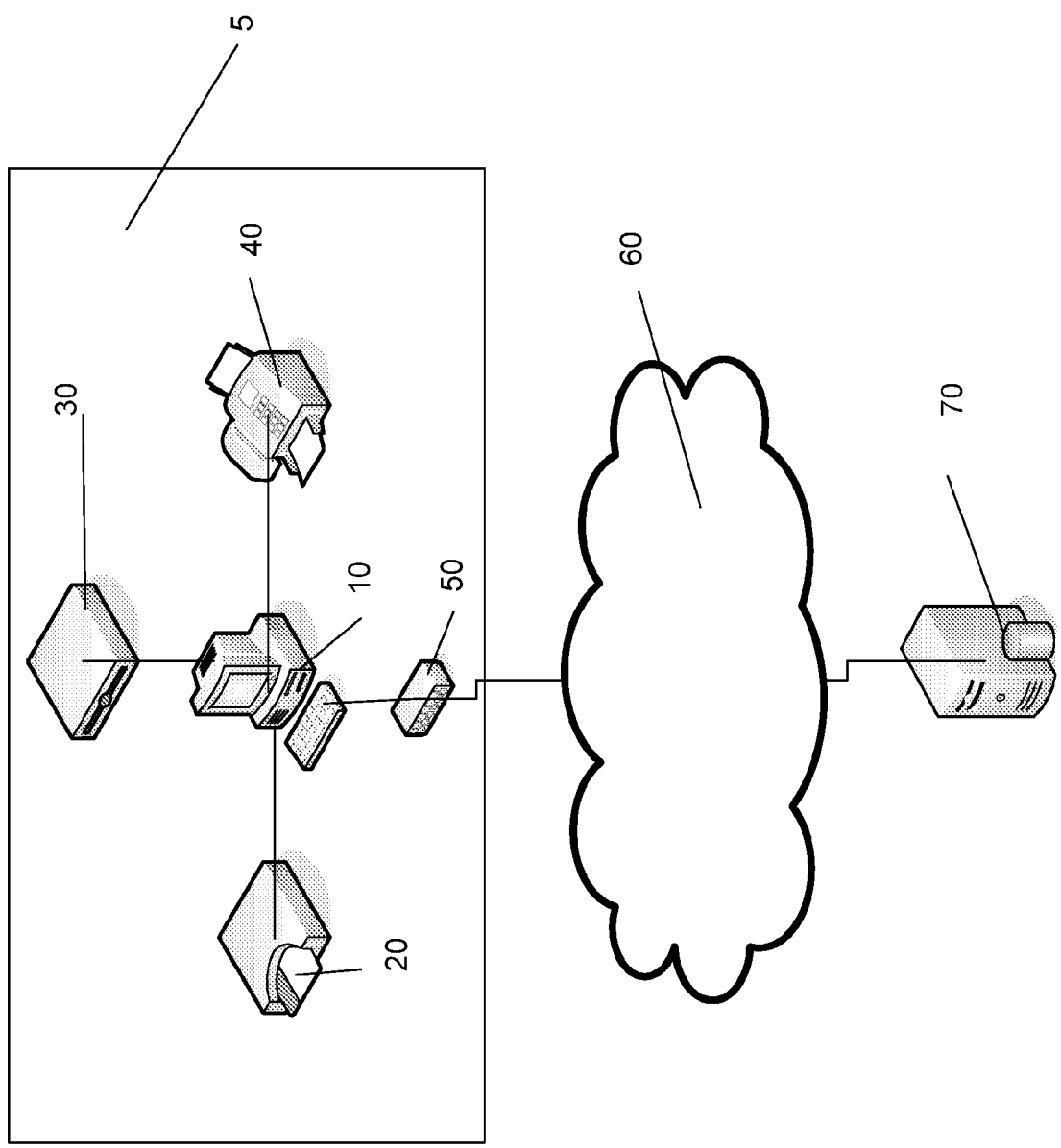
FIG. 1 is a schematic diagram illustrating an untrusted computer system suitable for use in combination with an embodiment of the present invention.

FIG. 1 is a schematic diagram of an untrusted computing system suitable for use with embodiments of the present invention.

The untrusted computing system 5 illustrated is a typical computer system such as a PC available today. It should be appreciated that the various components of the computer system are not intended to be in any way limiting and many other configurations and computer system types are equally applicable for use with embodiments of the present invention.

The untrusted computing system 5 includes a processing system 10, an interface 20, a hard disc 30, an I/O device 40 and a network device 50. The network device 50 connects the untrusted computing system 5 to a network 60 such as the Internet. A user may use the untrusted computing system 5 to access remote resources 70 such as e-mail or thin-client application servers.

Figure 2:
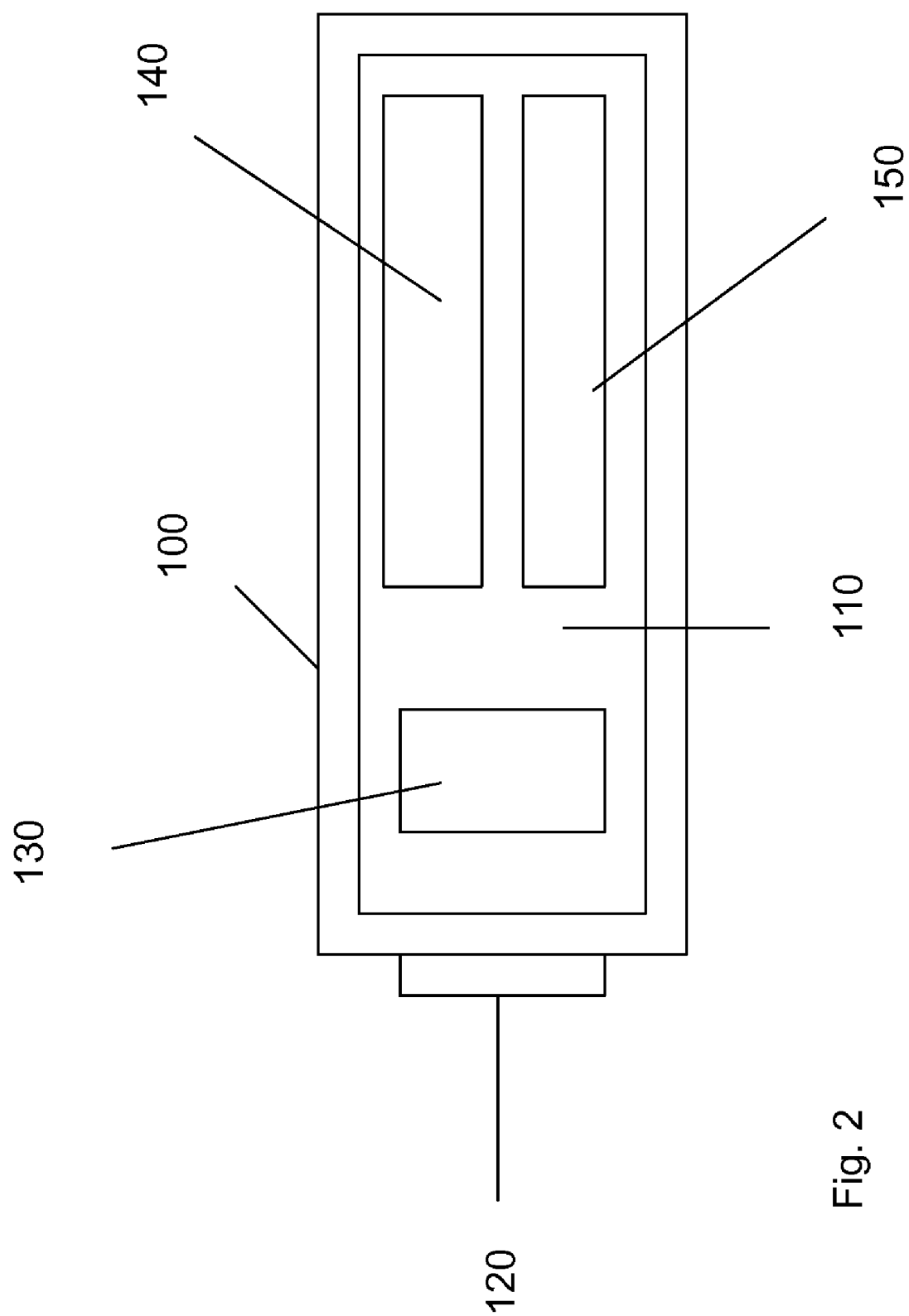
FIG. 2 is a schematic diagram of an embodiment of the present invention.

FIG. 2 is a schematic diagram of a system according to an embodiment of the present invention. The system 100 includes a carrier media 110 and an interface 120. The carrier media encodes a boot system 130, an encrypted computing environment 140 and optionally an encrypted data store 150.

Figure 3:
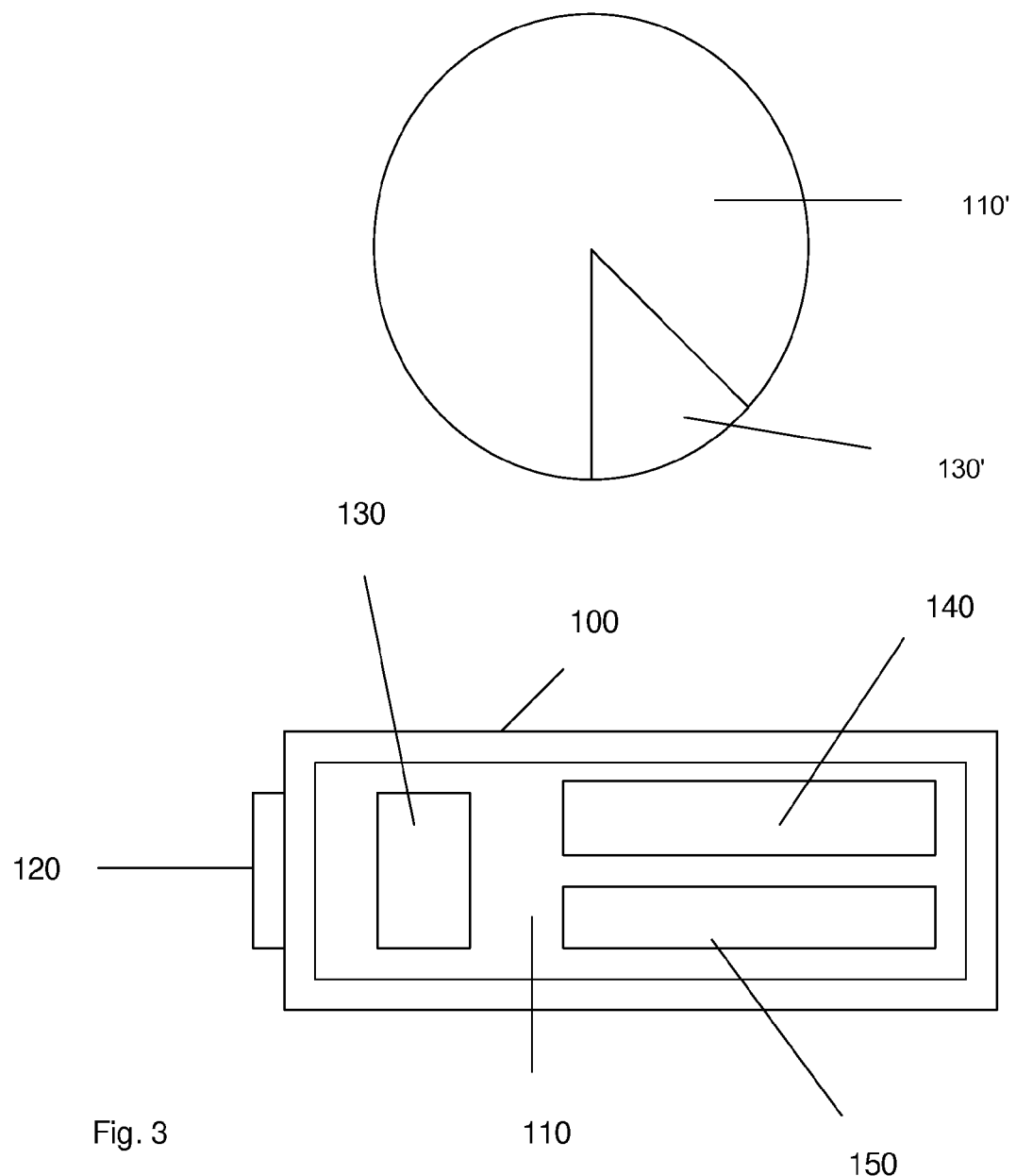
FIG. 3 is a schematic diagram of an alternate embodiment of the present invention.

FIG. 3 is a schematic diagram of a system according to an alternate embodiment of the present invention. The system 100 includes a first carrier medium 110 and an interface 120 and a second carrier medium 110'. The first carrier medium 110 encodes a boot system 130, an encrypted computing environment 140 and optionally an encrypted data store 150. The second carrier medium 110' encodes a further boot system 130'.

Figure 4:
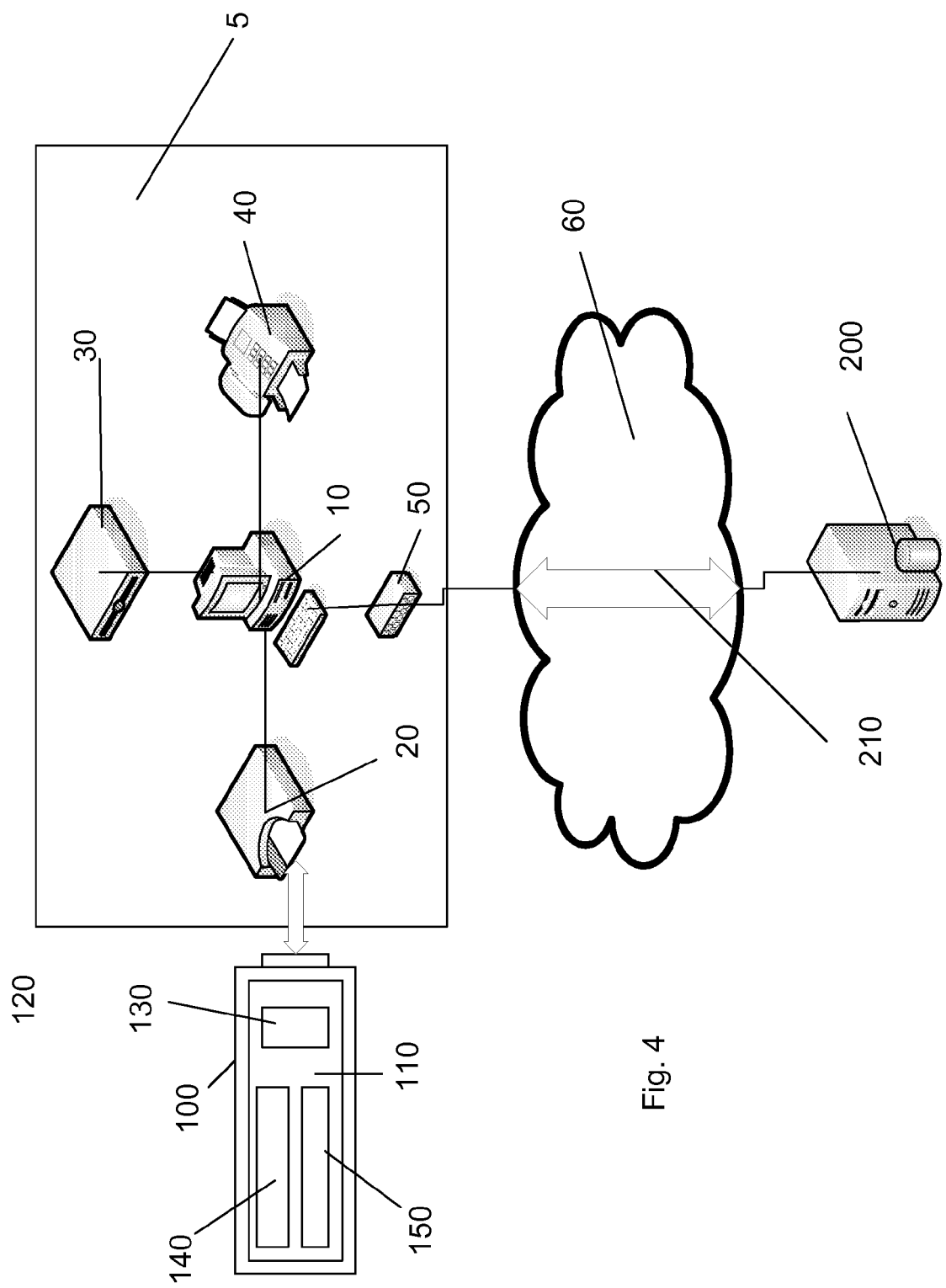
FIG. 4 is a schematic diagram of the embodiment of FIG. 2 when in use with the untrusted computer system of FIG. 1; and, FIGS. 5 and 6 are flow diagrams illustrating selected features of preferred embodiments of the present invention.

FIG. 4 is a schematic diagram illustrating operation of the embodiment of FIG. 2 when used in conjunction with the untrusted computing system 5 of FIG. 1.

The system 100 connects via its interface 120 to the interface 20 of the untrusted computing system 5. When the untrusted computing system 5 is powered on, it starts its boot process. The boot system 130 of the system 100 intercepts the boot process and performs an integrity check on the system 100 and the encrypted computing environment 140. If the integrity check passes, the boot system prompts the user via the untrusted computing system 5 to authenticate themselves. Authentication is performed via conventional mechanism such as user name and password inputted to the untrusted computer system 5 and it checked via the system 100. In an optional embodiment, the system 100 may include some form of biometric device such as a fingerprint reader that may also be used as part of the authentication process.

If authentication is unsuccessful then the system 100 either halts the boot process of the untrusted computer system 5 or alternatively returns control of the boot process to the untrusted computer system 5 to boot via its own operating system and resources. In either case, the system 100 blocks access to its resources such as the encrypted computing environment 140, the data store 150 and the like.

If authentication is successful then the boot system 130 decrypts the encrypted computing environment 140 that is encoded on the carrier media 110 of the system 100 and loads this into the volatile memory of the untrusted computer 5. The computing environment loaded into the memory then provides a secure computing environment for the user based on preconfigured parameters stored on the carrier media 110 of the system 100. If the system 100 includes the optional data store 150, this data is accessible from the computing environment and additional data can be written to this data store 150.

Where the alternate embodiment of FIG. 3 is used, the untrusted computer system 5 can be booted from the second carrier medium 110' (for example a CD). The further boot system 130' intercepts the boot process in the manner discussed above but subsequently transfers control to the system 100. If necessary, the further boot system 130' may load drivers necessary for the system 100 to be accessed by the untrusted computer system 5. It will be clear that various configurations can be provided for the secure computing environment. For example, the secure computing environment can be a completely sealed environment without any permitted access to devices such as the I/O device 40, disc 30 and network device 50 of the untrusted computing system 5. Alternatively, selected device types such as scanners may be enabled for access. In one embodiment, the computing environment may enable predetermined IP addresses to be accessed via an appropriate network device. In this manner, corporate resources 200 could be made accessible via a particular IP address and preferably via a virtual private network 210 to that IP address. Appropriate credentials and security certificates can be encoded in an encrypted form on the carrier media 110 such that transparent access to those corporate resources is possible from the computing environment.

Preferably, the computing environment takes full control of the untrusted computing system 5 to lock down access to itself and to any resources of the untrusted computing system 5. In particular, the shutdown process may be controlled by the computing environment to ensure that volatile memory is wiped (for example by repeated over writing of random data) during the shut down process such that no recoverable footprint is left by the computing environment. Optionally, the computing environment may be arranged to monitor the interface 20 of the untrusted computer system 5 such that if the system 100 is removed from the interface 20, shutdown procedure is automatically initiated and the secure computing environment is wiped from the untrusted computing system 5.

The wiping of the computing environment is preferably achieved in a manner that fully ensures preservation of the application doing the wiping, and its ability to address all of physical memory, i.e. not just the virtual memory mapped by the OS. This process is illustrated in the flow diagram of FIG. 5.

In step 300, A memory wiping process is installed in physical memory. In step 310, the memory wiping process checks to ensure sure it is the last process running and that memory mapped files are in sync with physical disks. If not, the process waits for a predetermined period in step 320 and loops to step 310 to check again. Optionally, the process may (possibly after a predetermined amount of time has expired) ask the system to end any other processes still running. These steps are taken to ensure there is no corruption of disk data. In step 330, the memory wiping process wipes physical memory above and below itself in the memory space. Wiping is preferably performed by writing data into the physical memory to overwrite any prior content.

Figure 5:
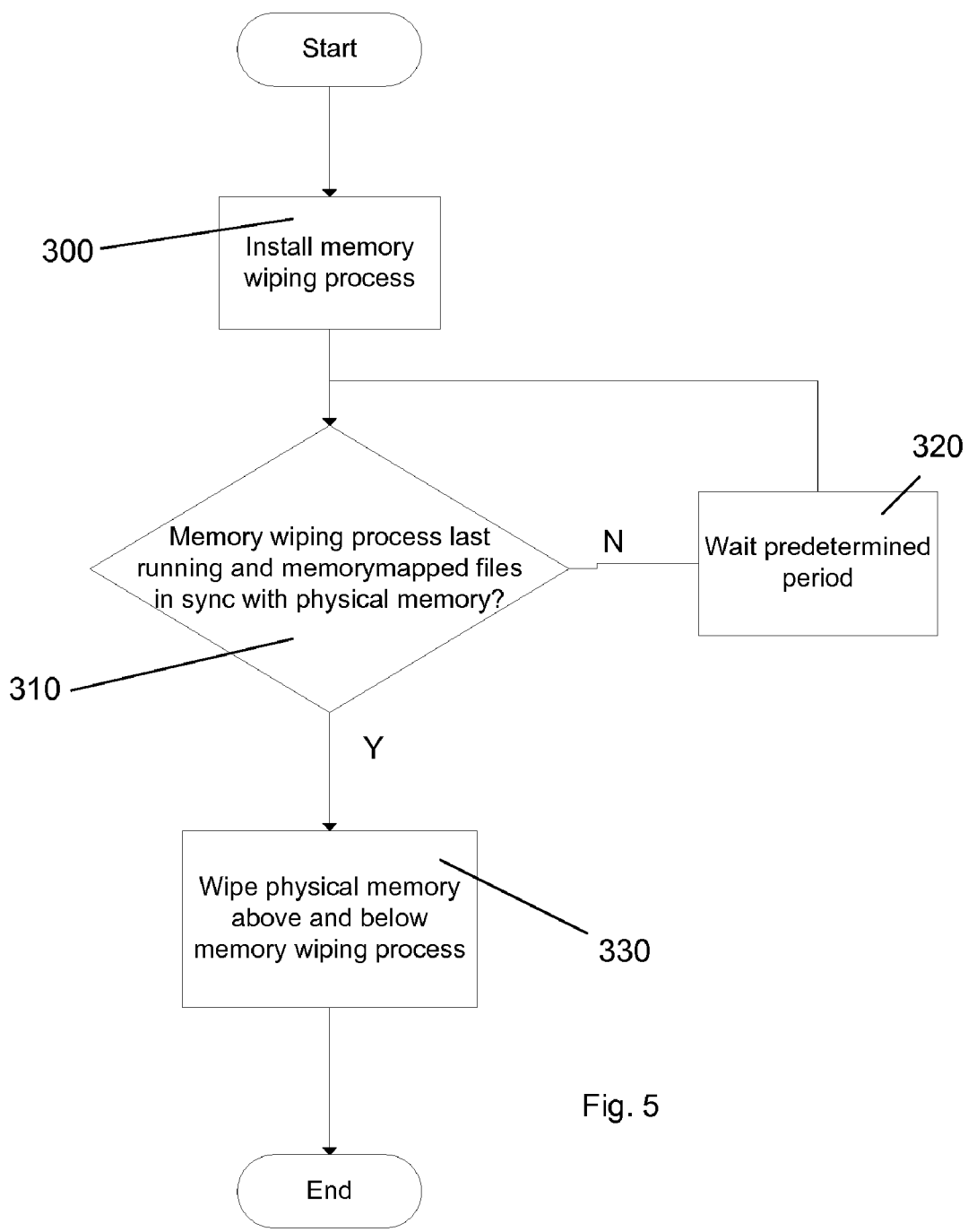
Figure 6:
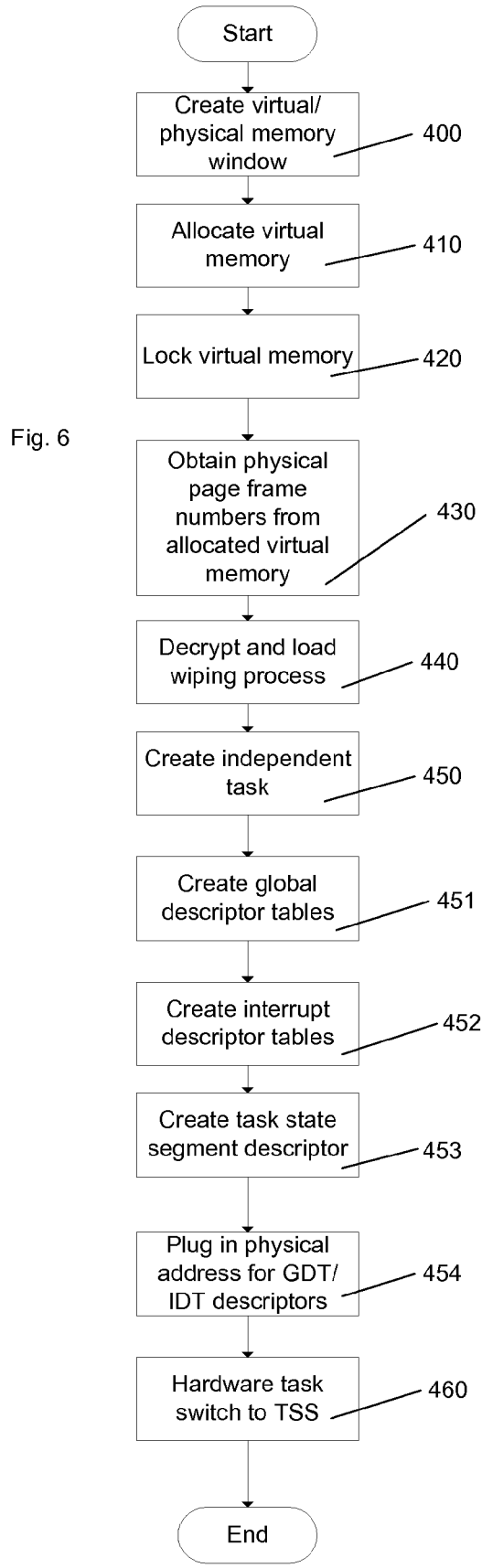

FIG. 6 is a flow diagram illustrating step 300 of FIG. 5 in more detail.

In step 400, the memory wiping process creates a virtual/physical memory window. This is done by allocating some virtual memory to hold the wiping process' code and system descriptors in step 410, locking virtual memory in step 420 to prevent the OS from reallocating associated physical pages, obtaining all physical page frame numbers from allocated virtual memory in step 430 and decrypting (if encrypted) and loading the wiping process code in the allocated virtual memory in step 440.

A new independent task is then created in step 450 by:
Creating global descriptor tables (GDT) in step 451;
Create interrupt descriptor tables (IDT) in step 452;
Create Task State Segment (TSS) descriptor for a 32 bits flat address space without paging enabled in step 453; and,
Plugging in a physical address (page frame numbers identified in step 430) for GDT/IDT descriptors into the TSS in step 454.

A hardwired task switch to the TSS is then performed in step 460.

This causes the system to switch into flat 32 bit protected mode without paging, and start the wiper code.

The approach may be regarded as building a boot process in 'reverse' by replacing cpu tables by ones specifically developed for this task.

Making sure the controlling process is the last process to run, prohibiting networking and recovery from the cleanup process.

Once it is determined that the process is the last running, a 'transition' page is allocated and set up. Clean up is then performed from the protected transition page.

Optionally, various user profiles may be supported by the system 100. This may be in the form of different encrypted computer environments 140 stored on the carrier media such that each user profile accesses a different computer environment that may be differently configured or allowed different resources to be used. Alternatively, a single computer environment may include different profiles to allow access to different resources, data and the like depending on the trustworthiness of the user.

The computing environment or boot system may be arranged to detect whether it is being booted in a virtualized environment and halt the boot process in this eventuality. A serial number associated with the carrier media may be recorded within the computing environment or boot system and again the boot process may be halted if this does not match the serial number of the carrier media being holding the system 100. The computing environment may be arranged to automatically shutdown after a predetermined period of inactivity. A detection for hub devices may also be performed to prevent the system 100 being used across a possibly compromised hub such as a USB hub.

Management functionality can also be implemented such as revocation of the system 100 by serial number, username or certificate. In such a situation, the boot system would include a mechanism to check token revocation status. Revocation may trigger secure erasure of the computing environment from the carrier media. Patching may be performed in a similar manner.

Various different operating systems and loaded applications may be provided as different computing environments either on the same carrier media or differing carrier media.

The memory stick could be arranged to contain multiple encrypted data partitions that could be accessed both with the secure environment and from a trusted machine running an encryption driver.

It could also be arranged that there is a clear data partition (unencrypted data) and it is only this one normally sees if the device is plugged in to a windows machine not running the above driver—i.e. Windows would only pick up the first clear partition from the partition table.

The invention claimed is:

1. A system comprising a carrier media and an interface, the interface being connectable to a computer to enable communication between the computer and the carrier media, wherein the carrier media encodes a secure computing environment and a boot system and preconfigured parameters, upon connection of the system via the interface to a computer system and booting of the computer system, the boot system being operative to take over the boot process of the computer system and to authenticate the user, wherein upon successful authentication, the boot system is arranged to load the secure computing environment on the computer system, the secure computing environment using the preconfigured parameters to prevent predetermined interaction from outside the secure computing environment when it is running; and a system monitor arranged to monitor operation of the computer system whilst under the control of the secure computing environment and arranged to install a memory wiping process in physical memory of the computer system, the memory wiping process, upon determining no other processes are running, being operative to wipe physical memory not occupied by itself so as to erase data stores in volatile memory of the computer system upon shut down of the computer system.

2. A system according to claim 1, further comprising a data storage repository, wherein the system is arranged to permit access to the data storage repository only via the secure computing environment.

3. A system according to claim 1, wherein the carrier media comprises a bootable solid-state memory.

4. A system according to claim 3, wherein the carrier media and interface comprises a USB key.

5. A system according to claim 1, further comprising a further boot system encoded on media remote of the carrier media, the further boot system being arranged to take over the boot process of the computer system, to interface with the boot system on the carrier media and pass control of the boot process to the boot system on the carrier media.

6. A system according to claim 1, further comprising an interface monitor arranged to monitor connection of the interface to the computer system whilst the computer system is under the control of the secure computing environment and arranged to erase data stored in volatile memory of the computer system upon disconnection of the interface from the computer system.

7. A system according to claim 1, wherein the secure environment is arranged to provide controllable access to predetermined external resources.

8. A system according to claim 1, wherein the secure environment is encrypted on the carrier media, the boot system being arranged to decrypt the secure computing environment upon successful authentication.

9. A system according to claim 1, wherein the carrier media comprises a plurality of encrypted data repositories, wherein at least one of the encrypted data repositories is accessible from within the secure environment and from a computing system running an encryption driver.

10. A system according to claim 1, wherein the carrier media further comprises an unencrypted data repository, the system being arranged to hide all contents of the carrier media except the unencrypted data repository upon access by a computing system that is not running said secure computing environment or a predetermined encryption driver.

11. A system as claimed in claim 1, wherein the system monitor is arranged to install the memory wiping process in physical memory by obtaining virtual memory for code and system descriptors of the memory wiping process, locking the obtained virtual memory to prevent reassignment of associated physical pages, obtaining physical page frame numbers for the allocated virtual memory and loading the memory wiping process into the obtained virtual memory.

12. A method of providing a secure computing environment on an untrusted computer system comprising:
providing a system comprising a carrier media and an interface, the interface being connectable to a computer to enable communication between the computer and the carrier media, the carrier media encoding a secure computing environment and a boot system and preconfigured parameters;
upon connection of the system via the interface to a computer system and booting of the computer system, the boot system taking over the boot process of the computer system;
upon taking over the boot process, authenticating the user;
upon successful authentication, loading the secure computing environment on the computer system, the secure computing environment using the preconfigured parameters to prevent predetermined interaction from outside the secure computing environment when it is running;
monitoring operation of the computer system whilst under the control of the secure computing environment; and,
erasing data stored in volatile memory of the computer system upon shut down of the computer system including the steps of installing a memory wiping process in physical memory of the computer system, the memory wiping process, upon determining no other processes are running, wiping physical memory not occupied by itself.

13. A method according to claim 12, further comprising:
providing a data storage repository; and,
permitting access to the data storage repository only via the secure computing environment.

14. A method according to claim 12, further comprising:
providing a further boot system encoded on media remote of the carrier media;
taking over the boot process of the computer system using the further boot system;
interfacing with the boot system on the carrier media; and,
passing control of the boot process to the boot system on the carrier media.

15. A method according to claim 12, further comprising:
monitoring connection of the interface to the computer system whilst the computer system is under the control of the secure computing environment; and,
erasing data stored in volatile memory of the computer system upon disconnection of the interface from the computer system.

16. A method according to claim 12, further comprising providing controllable access via the secure computing environment to predetermined external resources.

17. A method according to claim 12, further comprising:
encrypting the secure computing environment on the carrier media; and,
decrypting the secure computing environment upon successful authentication.

18. A method according to claim 12, further comprising performing an integrity check of the carrier media and the encoded secure computing environment.

19. A method according to claim 12, further comprising:
providing an unencrypted data repository on the carrier media; and,
hiding all contents of the carrier media except the unencrypted data repository upon access of the data repository by a computing system that is not running said secure computing environment or a predetermined encryption driver.

20. A method as claimed in claim 12, wherein the step of installing the memory wiping process in physical memory includes:
obtaining virtual memory for code and system descriptors of the memory wiping process;
locking the obtained virtual memory to prevent reassignment of associated physical pages;
obtaining physical page frame numbers for the allocated virtual memory; and,
loading the memory wiping process into the obtained virtual memory.

* * * * *